Feb. 3, 1970 G. R. SCHULZ 3,493,158

TAPE HANDLING EQUIPMENT

Filed Oct. 30, 1967

4 Sheets-Sheet 1

INVENTOR.
GORDON RICHARD SCHULZ
BY
Christie, Parker & Hale
ATTORNEYS.

INVENTOR.
GORDON RICHARD SCHULZ
BY
Christie, Parker & Hale
ATTORNEYS.

Feb. 3, 1970

G. R. SCHULZ 3,493,158

TAPE HANDLING EQUIPMENT

Filed Oct. 30, 1967

4 Sheets-Sheet 4

INVENTOR.
GORDON RICHARD SCHULZ
BY
Christie, Parker & Hale
ATTORNEYS.

United States Patent Office 3,493,158

Patented Feb. 3, 1970

3,493,158

TAPE HANDLING EQUIPMENT

Gordon Richard Schulz, Tujunga, Calif., assignor to Leach Corporation, Pasadena, Calif., a corporation of Delaware Filed Oct. 30, 1967, Ser. No. 678,823
Int. Cl. G11b 15/29, 15/56
U.S. Cl. 226—119 34 Claims

ABSTRACT OF THE DISCLOSURE

A tape handling chassis is adapted to receive a cartridge in which an endless tape is stored. Two capstans are rotatably supported in the cartridge with axial and lateral play. Drive assemblies for the capstans are mounted on the chassis in approximate alignment with the respective axes of the capstans. The drive assemblies are axially movable into and out of engagement with the capstans. As the drive assemblies move into engagement with the capstans, the axes of the capstans are precisely aligned with the axes of the drive assemblies. The pinch rollers for the capstans serve to tension the tape between the capstans as the cartridge is loaded in the chassis. For this purpose, one of the pinch rollers is fixed against rotation opposite its direction of rotation during tape transport. The tape is stored in an ordered arrangement of loops in a bin area inside of the cartridge. The bends in the loops are concentrated in two spaced-apart regions of the bin separated by a middle region in which the straight connecting portions of the loops are concentrated. An eye is formed in the tape near the exit of the bin. The loops are formed by a surface having three distinct contours that produce the desired ordered arrangement.

BACKGROUND OF THE INVENTION

This invention relates to tape handling equipment and more particularly, to a tape handling chassis adapted to receive a cartridge in which tape is permanently stored.

In information storage and retrieval operations where many different lengths of tape are involved, it is particularly advantageous to store the lengths of tape permanently in individual cartridges and to transport the tape with a tape handling chassis adapted to receive the cartridges. Whenever it is desired to gain access to a particular length of tape, the cartridge in which this length of tape is stored is loaded into the chassis. A portion of the tape in the cartridge is exposed to the components on the chassis for the purpose of tape transport and the purpose of information storage and retrieval, but the tape remains within the cartridge while it is being transported. Thus, much less time is required to prepare a length of tape for transport and to remove the length of tape after transport than in equipment where tape is stored on a supply reel and wound onto a take-up reel. To prepare the tape for transport in the latter case, the supply reel must be mounted and locked on a hub, the tape on the reel must be threaded through the tape handling components in the prescribed tape path to the take-up reel, and the end of the tape must be secured to the take-up reel. In addition to the large expenditure of time required to carry out such an operation, the complexity of the operation requires that well-trained personnel be employed, and even then, human errors occur.

It is often advantageous to store an endless length of tape in the cartridges as loops, thereby avoiding the inertia associated with tape stored on reels. Consequently, very high tape transport speeds, for example, 160 inches per second, are realizable without vacuum columns.

In the design of a tape handling chassis adapted to receive a cartridge in which length of tape are stored, the principal aim is to locate as many of the tape handling components as possible on the chassis, particularly the precision components, with the result that the complexity of the cartridge itself is reduced as much as possible. This design philosophy permits tape handling equipment to be manufactured at a lower cost because for every chassis there are many cartridges.

Several distinct problems plague the currently available tape handling equipment employing cartridges. One such problem is the location of the drive capstan or capstans for transporting the tape. If the capstan is mounted on the chassis, it has been found necessary to place several guide rollers in each cartridge to direct the tape path so a good tape wrap is formed with the capstan. On the other hand, if a drive capstan is mounted in each cartridge, a precision shaft on which the capstan is mounted and rotary bearings that support the shaft must also be provided for each cartridge.

Another problem often associated with tape handling equipment employing cartridges is the creation of tension on the tape in the cartridge preparatory to tape transport. In order to transport tape effectively with a capstan, the tape must ordinarily be under tension to prevent slippage between the tape and the capstan as the capstan rotates. When an endless length of tape is stored in a cartridge as loops, the tape is naturally not under tension after it is removed from the chassis. Thus, a provision must be made for tensioning the tape before tape transport commences. Typically, this requirement adds further complexity to each cartridge.

Still another problem involves the arrangement of the tape in the cartridges to utilize the available space efficiently. Usually the tape is looped in a bin area within the cartridges. The tape enters the bin at one end, forms a large number of loops within the bin, exits from the bin at the other end, and extends past the tape handling components back to the entrance of the bin. In prior art equipment, the loops in the bin are not formed in an ordered arrangement that enables the tape to be pulled from the exit of the bin in a smooth, continuous operation. Typically, snags develop that momentarily create extraordinarily high tape tension, thereby causing the tape to snap and move uncontrollably out of the desired tape attitude established by the tape handling components. Felt pads or a tension roller must then be placed in each cartridge to try to damp in part the effects of these snags on the tape as it passes over the tape handling components.

The foregoing problems involving the use of tape cartridges become more acute as the width of the tape is increased because the misalignment of the parallel tracks recorded on the tape due to tape skew is a function of the tape width. Consequently, the width of tape that can be handled effectively and therefore the realizable recording density, is dependent upon a solution to those problems.

SUMMARY OF THE INVENTION

The invention contemplates tape handling equipment that is capable of transporting tape in a precisely controlled attitude at high tape transport speed while the tape is stored in a cartridge that has a minimum of tape handling components.

According to one aspect of the invention, a cartridge is provided with one or more capstans supported by the cartridge so as to be free to rotate with lateral and axial play. A drive assembly mounted on a tape handling chassis adapted to receive the cartridge is axially movable into and out of engagement with the capstan when the cartridge is loaded in the chassis. The capstan has circular holes at either end centered about its axis. As the drive assembly is brought into engagement with the capstan, a precision aligning hub on the drive assembly aligns the axis of the capstan with the axis of rotation of the drive assembly. Consequently, the capstan is driven while it is accurately positioned without a precision shaft and supporting rotary bearings in the cartridges. Furthermore, precise control over the tape attitude during transport can be achieved in this manner without placing any guide rollers in the cartridges.

According to a second aspect of the invention, the tape stored in a cartridge is tensioned between two points in the path of the tape handling components as the cartridge is loaded into its chassis. During the tensioning operation, the tape is held stationary at one of the points and passes over a rotatable, cylindrical tape handling element located at the other point. A window in the cartridge exposes the portion of the tape wrapped around the tape handling element to the exterior of the cartridge along a stretch where the direction of tape travel has a component that is substantially opposite the direction of the cartridge movement while being loaded into the chassis. A mechanism located on the chassis holds the tape exposed to the exterior of the cartridge by the window in substantially nonslipping contact with the tape handling element and rotates the tape handling element as the cartridge is being loaded into the chassis so the tape handling element tensions the tape between it and the point at which the tape is held stationary. The pinch roller associated with the capstan during tape transport can be adapted to serve as the mechanism by fixing it against rotation in the direction opposite the direction it rotates during tape transport. In a two-capstan system, the other capstan and its pinch roller can serve to hold the tape stationary as the cartridge is being loaded into the chassis.

Another aspect of the invention involves the arrangement of the tape stored in the cartridge and how this arrangement is achieved. Specifically, the tape forms an ordered arrangement of loops in a bin area within the cartridge. The loops are oriented approximately parallel to each other and the bends in the loops are concentrated in two spaced-apart regions within the bin separated by a region in which the connecting portions of the loops are concentrated. The bends are randomly distributed throughout the two spaced-apart regions. Near the exit of the bin where the tape is removed, the bends of the loop converge to form an eye from which the tape is pulled out of the bin. The loops are formed near the entrance of the bin by a surface having three different contours. The first contour forms a straight line extending from a point adjacent the edge of the capstan in the direction of tape travel; the second contour forms a straight line at a small angle to the first contour; and the third contour forms a gradual curve away from the loops in the bin area. After the tape moves over the capstan, it advances across the first and second contours to the third contour. After the tape advances a short distance along the third contour, it breaks away from the surface at the junction of the second and third contours, thereby forming two bends that develop into a loop as the tape advances again across the first and second contours.

BRIEF DESCRIPTION OF THE DRAWINGS

The features of a specific embodiment of the invention are illustrated in the drawings in which.

DESCRIPTION OF A SPECIFIC EMBODIMENT

Figure 4:
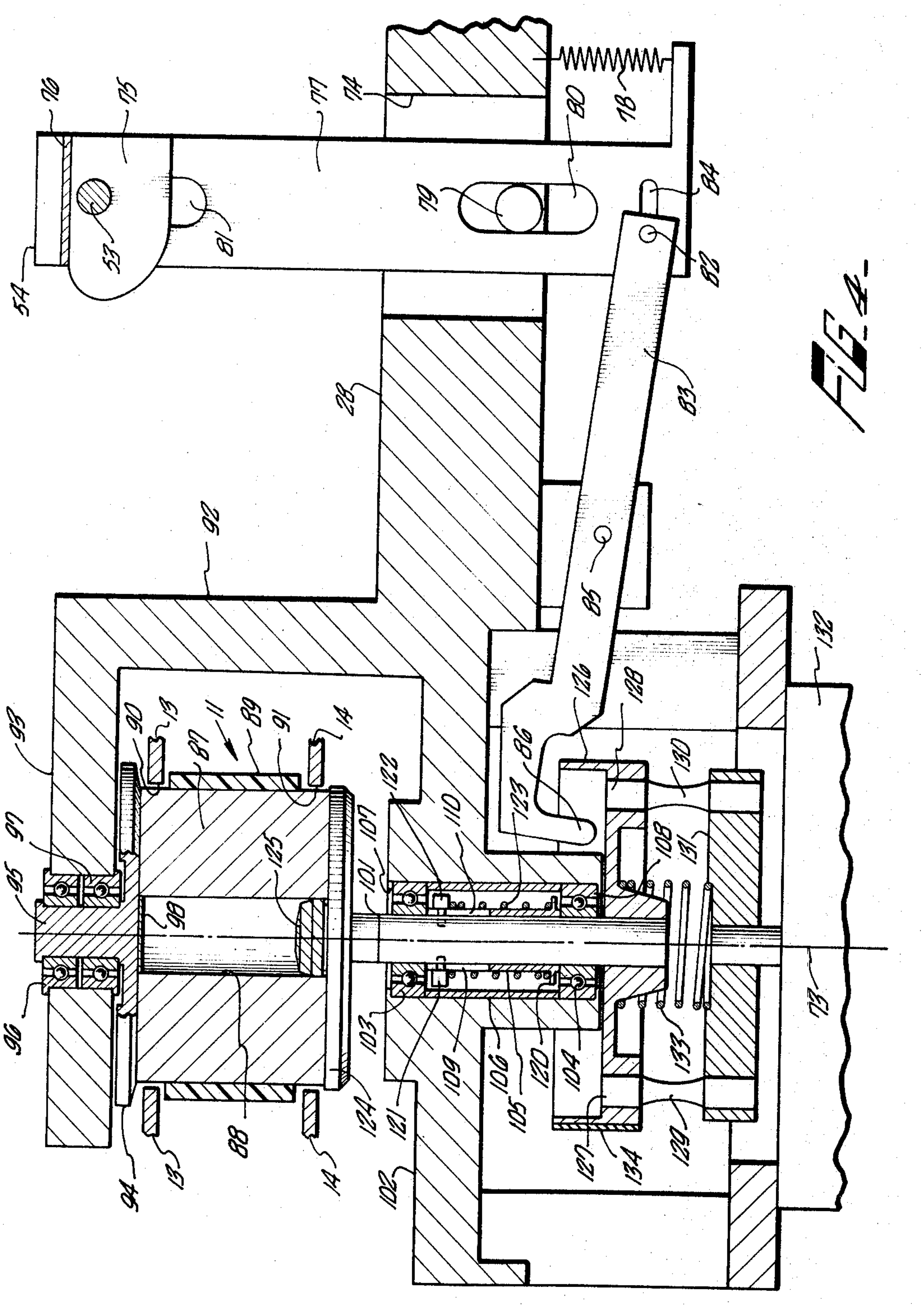
FIG. 4 is a front elevation view in section of one-half of the chassis depicting a capstan and its drive assembly.
Figure 5:
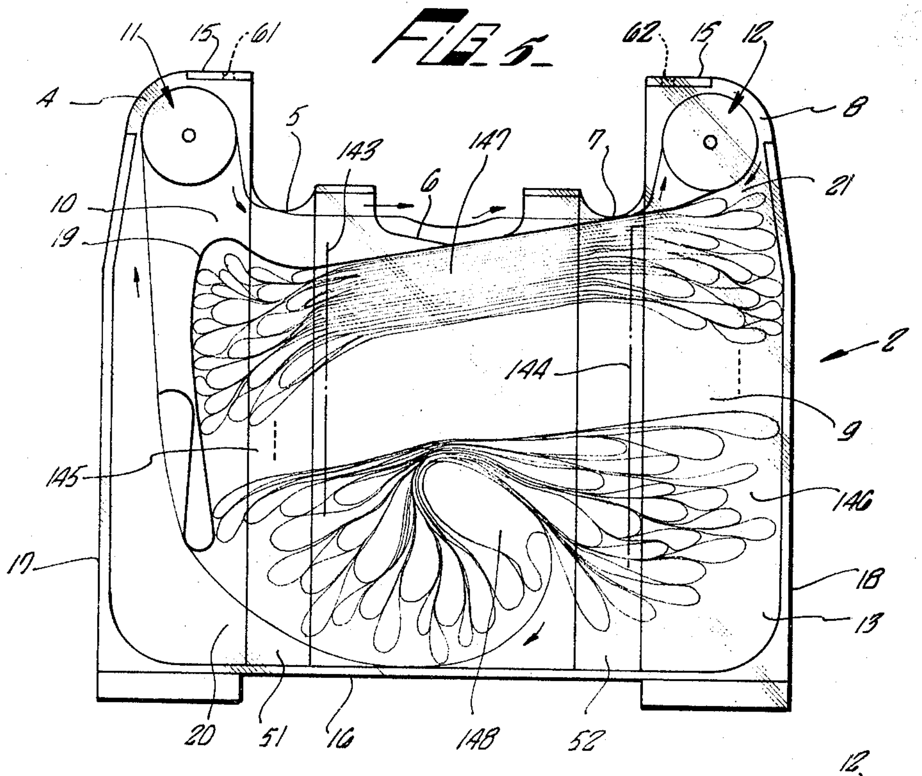
FIG. 5 is a top plan view of the cartridge in FIG. 1 illustrating in particular the arrangement of tape.

Reference is made to FIGS. 1, 2, 3, and 5 in which a tape handling chassis 1 and a tape cartridge 2 are shown in various views. As depicted in FIG. 5, an endless length of tape 3 is stored in cartridge 2. Cartridge 2 is an approximately rectangular enclosure with a top panel 13 and a parallel bottom panel 14 that are perpendicular to the width of tape 3. A side panel that is parallel to the width of tape 3 has a leading side 15, a trailing side 16, and transverse sides 17 and 18. The corners of the side panel where transverse side 17 and leading edge 15 meet and where transverse side 18 and leading edge 15 meet are rounded. Tape 3 is exposed to the exterior of cartridge 2 at various points along its path by windows 4, 5, 6, 7, and 8 in the side panel. The arrows in FIG. 5 designate the direction of tape transport when cartridge 2 is loaded in chassis 1. Basically, cartridge 2 is divided by an interior partition 19 into a bin area 9 by a transport area 10. Tape 3 is stored in bin area 9 in an ordered arrangement of loops and extends through transport area 10 in a path that passes over certain tape handling components including capstans 11 and 12 located within cartridge 2 itself. As shown in FIG. 5, capstans 11 and 12 are located at and follow the curve of the rounded corners in the side panel. The details of the mounting of capstans 11 and 12 in cartridge 2 are discussed below in connection with FIG. 4. Drive assemblies mounted on chassis 1, which are also discussed in detail below in connection with FIG. 4, engage capstans 11 and 12 after cartridge 2 is loaded in chassis 1. When tape 3 is being transported, capstans 11 and 12 pull tape out of an exit 20 in bin area 9, move the tape through transport area 10, and feed the tap back into bin area 9 through an entrance 21. Capstan 12 is driven at a slightly higher speed of rotation than capstan 11 to create tension on the tape extending therebetween during transport. The ordered arrangement of tape loops within bin area 9 and their formation are also discussed in detail below.

Figure 2:
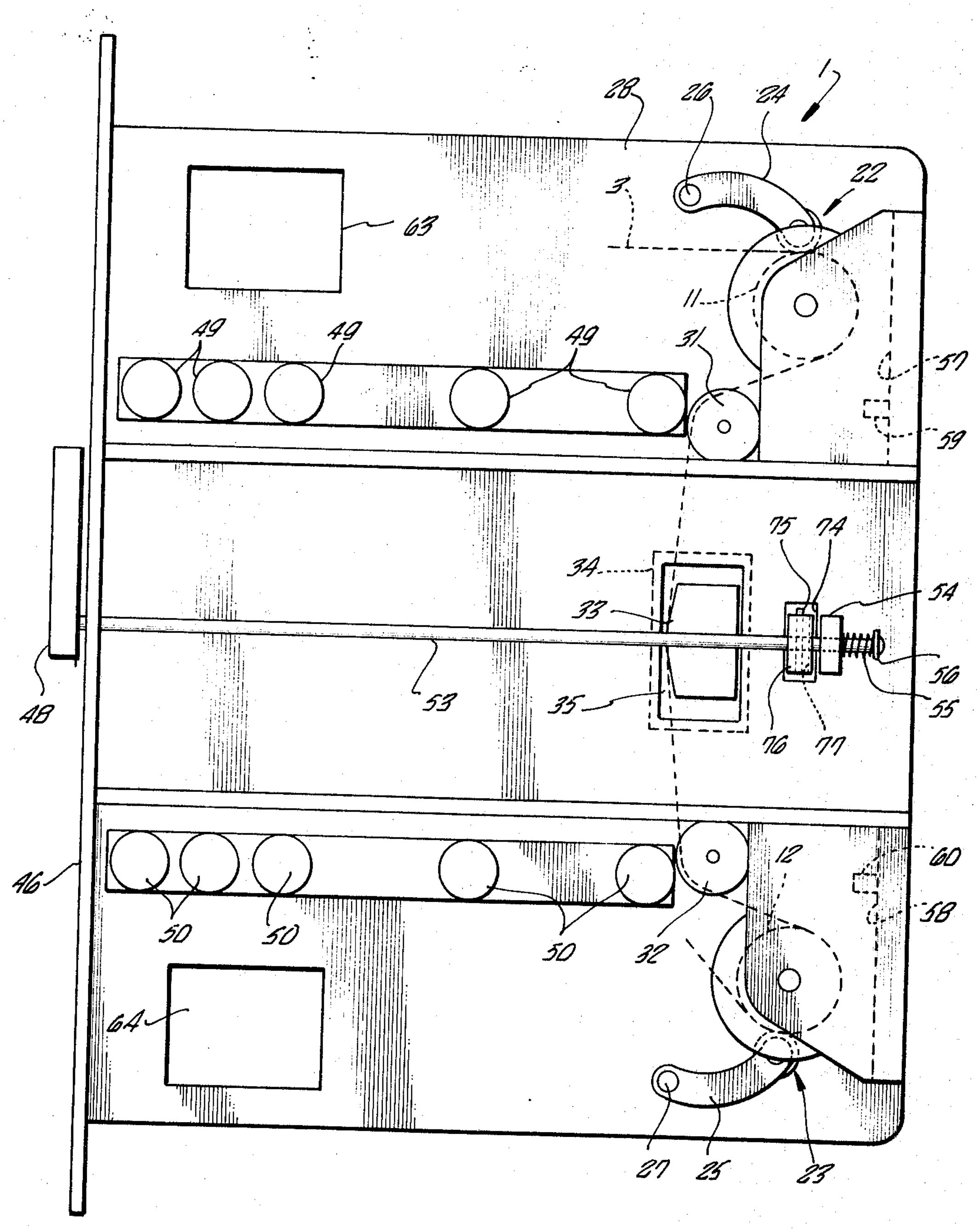
FIG. 2 is a top plan view of the chassis of FIG. 1 without the tape cartridge.

The other tape handling elements over which tape 3 passes when cartridge 2 is loaded in chassis 1 are mounted on chassis 1 as shown in FIG. 2. The path of tape 3 through the tape handling components mounted on chassis 1 as well as capstans 11 and 12 are represented in FIG. 2 in phantom. Pinch rollers 22 and 23 come in contact with tape 3 through windows 4 and 8 (FIGURE 5), respectively, pressing tape 3 against capstans 11 and 12 respectively. Pinch rollers 22 and 23 are mounted on pivot arms 24 and 25, respectively. Pivot arms 24 and 25 are fixed to vertical rods 26 and 27, respectively, which are rotatably mounted on a base plate 28 of chassis 1. Rods 26 and 27 extend through base plate 28 to the bottom of chassis 1 where they are biased by springs 29 and 30 (FIG. 3) so pinch rollers 22 and 23 are urged inwardly toward capstans 11 and 12, respectively. As viewed from the top of chassis 1 in FIG. 2, pinch roller 22 is urged in a clockwise direction and pinch roller 23 is urged in a counterclockwise direction. Flanged guide rollers 31 and 32 are also mounted on base plate 28. When cartridge 2 is loaded in chassis 1, guide rollers 31 and 32 come in contact with tape 3 through windows 5 and 7 (FIGURE 5), respectively, and serve to control the transverse position of tape 3 as it passes a transducer 33 located between guide rollers 31 and 32. An electronic package 34 is mounted on the underside of base plate 28 by means not shown. Transducer 33 which is an integral part of electronic package 34 extends through an opening 35 in base plate 28 to a point adjacent window 6 (FIGURE 5) of cartridge 2 when loaded. When tape 3 is tensioned prior to transport as described in detail below, it is forced out of window 6 and against the surface of transducer 33 to enable information storage and retrieval on tape 3 according to well-known techniques. If tape 3 is magnetic tape, transducer 33 would be a magnetic read and/or write head of well-known construction and electronic package 34 would include well-known read and/or write circuitry. As shown in FIGURE 5, the sections of the side panel between windows 5 and 6 and between windows 6 and 7 are sufficiently long to contain the tape between capstans 11 and 12 within cartridge 2 while it is being carried about.

Figure 1:
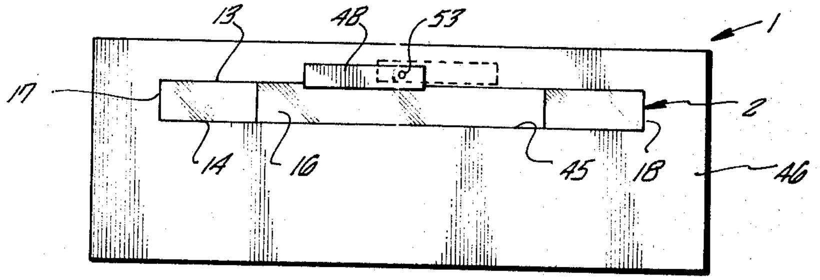
FIG. 1 is a front plan view of a tape handling chassis and a tape cartridge loaded in the chassis.

Cartridge 2 (FIGURE 1) is loaded into chassis 1 by translating it through a slot 45 in a front panel 46. Leading side 15 (FIGURE 5) is inserted through slot 45 first. A handle 48 in its closed position extends slightly over slot 45 and retains cartridge 2 within chassis 1 as illustrated in FIG. 1. Before loading cartridge 2 in chassis 1, handle 48 must be rotated clockwise as viewed in FIG. 1 to its open position, represented in phantom in FIG. 1, in order to clear slot 45 for the passage of cartridge 2 and disengage the drive assemblies. As cartridge 2 is being pushed into chassis 1 through slot 45 in a direction parallel to transverse sides 17 and 18, rows 49 and 50 of inwardly canted rollers 49 and 50 engage grooves 51 and 52, respectively (FIG. 5) which are formed in the exterior surface of bottom panel 14 of cartridge 2 and guide cartridge 2 to the tape transport position. Slightly before cartridge 2 reaches the tape transport position, pinch rollers 22 and 23 come into contact with tape 3 through windows 4 and 8 in cartridge 2 and remain in contact with tape 3 thereafter until cartridge 2 is unloaded from chassis 1.

Figure 7:
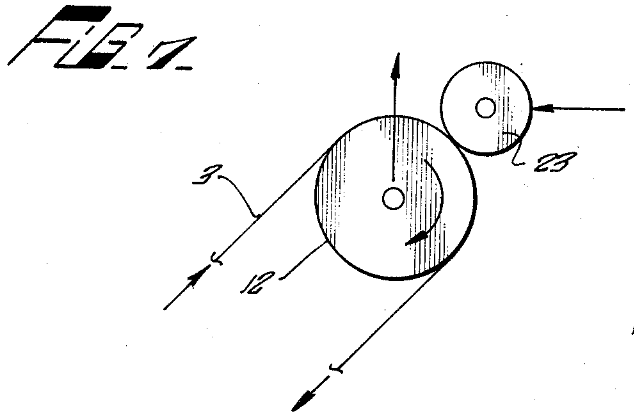
FIG. 7 is a representation of a capstan in the cartridge and a pinch roller on the chassis depicting the tape tensioning operation at the cartridge is loaded in the chassis.

A problem associated with the storage of an endless length of tape in a cartridge without tape storage reels or vacuum columns is the provision of a mechanism to tension the tape prior to the beginning of tape transport. Tape lying at rest in a cartridge in loops is naturally in a loose, relaxed condition. The tensioning operation is accomplished by pinch rollers 22 and 23 and capstans 11 and 12 while cartridge 2 is moved toward the final tape transport position. Pinch roller 22 is free to rotate in either direction. But pinch roller 23 is free to rotate only in the direction it rotates during tape transport, i.e., the counterclockwise direction as viewed in FIG. 2, and and is fixed against rotation in the opposite direction, i.e., the clockwise direction as viewed in FIG. 2. Pinch roller 23 could be provided with conventional restraining elements such as a ratchet to prevent rotation in the opposite direction. During the approach of cartridge 2 to the final tape transport position, after pinch rollers 22 and 23 come in contact with tape 3 and pushes against capstans 11 and 12, respectively, pinch roller 22 slips with respect to tape 3 and thereby holds the portion of tape 3 in contact with capstan 11 substantially stationary as capstan 11 moves rearward in chassis 1. At the same time, capstan 12 and tape 3 rotate together in a clockwise direction as viewed in FIG. 2, moving in substantially nonslipping relationship across the surface of nonrotating pinch roller 23 as capstan 12 moves rearward in chassis 1. As a result, the tape wrapped around capstan 12 moves in the direction of tape travel to tension the tape between capstans 11 and 12. The movement of capstan 12, tape 3, and pinch roller 23 taking place during the tensioning operation is represented in FIG. 7.

Figure 3:
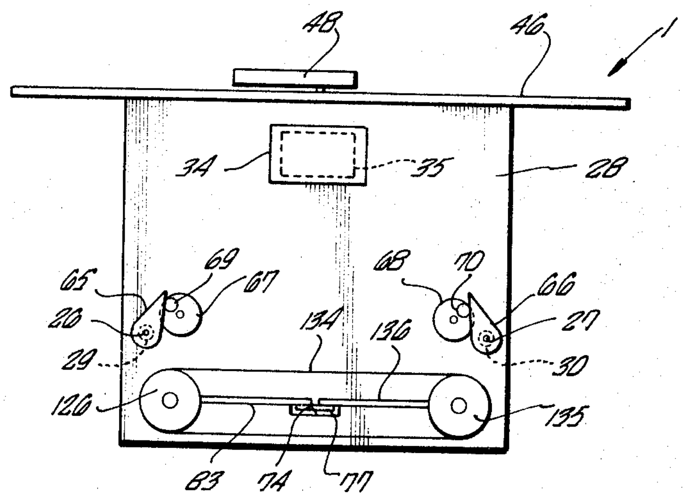
FIG. 3 is a bottom view in section of the chassis of FIG. 1.

It is necessary for pinch rollers 22 and 23 to exert more force against capstans 11 and 12, respectively, during transport than during the tensioning operation. As illustrated in FIG. 3, linkages 65 and 66 are fixed to rods 26 and 27, respectively, on the underside of base plate 28. Switches 67 and 68, which are mounted to the underside of base plate 28, have arms 69 and 70, respectively, that rotate outwardly (counterclockwise for switch 67 and clockwise for switch 68 as viewed in FIG. 3) to engage linkages 65 and 66, respectively, when switches 67 and 68 are actuated. While cartridge 2 is being loaded in chassis 1, switches 67 and 68 are not actuated so arms 69 and 70 are out of contact with linkages 65 and 66, respectively. In this case, the force exerted by pinch rollers 22 and 23 on capstans 11 and 12, respectively, is determined by the spring constant of springs 29 and 30. This force is relatively small, being only sufficient to carry out the tape tensioning operation. After cartridge 2 is loaded in chassis 1 and preparatory to tape transport, switches 67 and 68 are actuated so arms 69 and 70 engage linkages 65 and 66, respectively. As a result, pinch rollers 22 and 23 exert a much larger force on capstans 11 and 12, respectively.

Handle 48 is fixed to a horizontal rod 53 extending through front panel 46 to a point near the rear of chassis 1. At the rear of chassis 1, a vertical support member 54, which is attached to base plate 28, holds rod 53. As handle 48 is rotated from one position to the other, rod 53 rotates with respect to front panel 46 and vertical member 54. A compression spring 55 is held between the surface of vertical member 54 and a spring keeper 56. Thus, rod 53 and handle 48 are urged toward the rear of chassis 1. Chassis 1 has vertical back support members 57 and 58 (FIG. 2) from which indexing pegs 59 and 60 extend horizontally toward the front of chassis 1. When cartridge 2 is loaded in chassis 1, indexing pegs 59 and 60 engage holes 61 and 62 (FIGURE 5), respectively, in leading side 15 of cartridge 2. After cartridge 2 is loaded in chassis 1, handle 48 is rotated to the closed position. In the closed position, the bottom surface of handle 48 which bears against trailing side 16 of cartridge 2 is chamfered to an angle of approximately 45 degrees. By virtue of spring 55, the chamfered surface of handle 48 bears firmly against trailing side 16 of cartridge 2 both horizontally in a rearward direction and vertically in a downward direction. Thus, cartridge 2 is urged against vertical back supports 57 and 58, thereby precisely determining its forward-backward position in the horizontal plane. The sideward position of cartridge 2 in the horizontal plane is precisely determined by indexing pegs 59 and 60 together with the chamfered surface of handle 48. The chamfered surface of handle 48 presses cartridge 2 vertically downward against pads 63 and 64 (FIG. 2) which together with indexing pegs 59 and 60 precisely determine the vertical position of cartridge 2.

In addition to helping to position and secure cartridge 2 in chassis 1, handle 48 also serves to engage the drive assemblies with capstans 11 and 12. In this connection reference is made to FIG. 4, which shows the drive assembly for capstan 11. The drive assembly for capstan 12 is identical thereto, except for the absence of a motor. A cam 75 is fixed to rod 53 near the rear of chassis 1. A horizontal cam follower 76, which rides against cam 75, is attached to the end of a movable vertical member 77 extending underneath base plate 28 through an opening 74. Vertical member 77 is urged upwardly against the surface of cam 75 by a compression spring 78 connected between vertical member 77 and the underside of base plate 28. A pawl 79 and rod 53 ride in slots 80 and 81, respectively, in member 77, thereby restraining it to move only vertically. A pawl 82 which is fixed to one end of a pivot arm 83 rides in a slot 84 in member 77. Pivot arm 83 is fixed to a shaft 83 that is rotatably mounted to the bottom of base plate 28. A hook 86 is located on the other end of pivot arm 83. The parts are shown in FIG. 4 in the positions they assume when handle 48 is in the closed position and the drive assemblies are engaged with capstans 11 and 12. When handle 48 is moved to the open position so as to disengage the drive assemblies, rod 53 is rotated 180 degrees in a clockwise direction as viewed in FIG. 4. As a result, cam follower 76 and vertical member 77 are raised and pivot arm 83 is rotated counterclockwise about shaft 85 from the position represented in FIG. 4.

The mounting of capstan 11 within cartridge 2 is illustrated in detail in FIG. 4. Capstan 11 comprises a cylindrical core 87 with a cylindrical hole 88 through its center and a cylindrical sheath 89 surrounding core 87. Sheath 89 is preferably made of a porous material such as epoxy-impregnated Fiberglas so a large frictional force exists between the surface of capstan 11 and tape 3. Top and bottom panels 13 and 14 of cartridge 2 have aligned circular holes 90 and 91 with a larger diameter than core 87 and a smaller diameter than sheath 89. The height of core 87 is slightly larger than the distance between the exterior surfaces of top and bottom panels 13 and 14 of cartridge 2 so the ends of core 87 are exposed to the exterior of cartridge 2. The height of sheath 89 is slightly smaller than the distance between the interior surfaces of top and bottom panels 13 and 14 of cartridge 2. As a result, capstan 11 is supported by top and bottom panels 13 and 14 of cartridge 2 in a rather loose fit, for example, with a tolerance of $\frac{1}{32}$ inch. Thus, capstan 11 has appreciable axial and lateral play within cartridge 2 while capstan 11 is out of engagement with its drive assembly. No precision shaft or rotary bearing for effecting rotating of capstan 11 is provided in cartridge 2.

A side support 92 extends vertically upward from the top of base plate 28 and is connected to a horizontal support 93 spaced a short distance from top panel 13 of cartridge 2 when loaded in chassis 1. A circular plate 94 is fixed to a shaft 95 on the underside of support 93 adjacent capstan 11. Shaft 95 is rotatably mounted to support 93 by rotary bearings 96 and 97. A circular retaining disc 98, which is designed to fit snugly within hole 88, is attached to the surface of plate 94 adjacent to capstan 11. Shaft 95, bearings 96 and 97, and plate 94 are precision components that rotate about a drive assembly axis 73 without appreciable axial or lateral play. Furthermore, the surface of plate 94 adjacent to capstan 11 is exceptionally flat and perpendicular to axis 73, and disc 98 is centered about axis 73 so capstan 11 can be precisely positioned when the drive assembly is engaged.

The drive assembly for capstan 11 includes a drive shaft 101 that is rotatably supported with respect to a drive assembly support structure 102 by rotary bearings 103 and 104. Support structure 102 is integral with base plate 28. A cylindrical sheath 105, which surrounds shaft 101, serves as a spacer for the inner races of bearings 103 and 104. A cylindrical sheath 106, which is surrounded by support structure 102, serves as a spacer of the outer races of bearings 103 and 104. Thus, bearings 103 and 104 are fixed against movement in the direction of drive assembly axis 73 by sheaths 105 and 106 and lips 107 and 108 of structure 102. At the top of sheath 105, slots 109 and 110 are located. Slots 109 and 110 run parallel to axis 73. At its lower end, sheath 105 has an integral flange 120. Set screws 121 and 122 are attached to and extend radially from shaft 101, riding in slots 109 and 110, respectively. A compression spring 123 is mounted between flange 120 and set screws 121 and 122. Spring 123 bears against set screws 121 and 122 and therefore urges shaft 101 upward. A circular plate 124 is fixed to the upper end of shaft 101. A chamfered aligning hub 125 is mounted on the top surface of plate 124 in alignment with axis 73. The top surface of plate 124 is very flat and perpendicular to axis 73. A pulley 126 is fixed to the lower end of shaft 101. Pulley 126 has four holes through it, such as those designated 127 and 128, into which four fingers, such as those designated 129 and 130, fit snugly. The intermediate portions of the fingers are slightly bowed to relax the tolerance requirement when the drive assembly is disengaged. This bowed effect is accentuated in FIG. 4. The four fingers are embedded in and fixed to a wheel 131, which is driven by the shaft of a motor 132. Motor 132 is preferably a low inertia quick responding motor such as a printed circuit motor. FIG. 4 represents the drive assembly in engagement with capstan 11. A compression spring 133 between wheel 131 and pulley 126 urges pulley 126 upward. When the drive assembly is out of engagement with capstan 11 as is the case while cartridge 2 is being loaded in chassis 1, handle 48 is in its open position and cam 75 is rotated 180 degrees in a clockwise direction from the position shown in FIG. 4. Thus, vertical member 77 is raised and pivot arm 83 is rotated in a counterclockwise direction, so hook 86 holds pulley 126 in a downward position with the holes in pulley 126 located near the center of the fingers in wheel 131. Accordingly, shaft 101 and plate 124 are held in a downward position clear of cartridge 2 as it is loaded into chassis 1. When handle 48 is turned to the closed position, cam 75 moves 180 degrees in a counterclockwise direction to the position shown in FIG. 4, vertical member 77 moves downward pivot arm 83 rotates in a clockwise direction and hook 86 moves out of contact with pulley 126. Consequently, springs 123 and 133 push pulley 126, shaft 101, and plate 124 upward into engagement with capstan 11. While plate 124 is moving upward, aligning hub 125 precisely aligns the axis of capstan 11 with drive assembly axis 73.

A belt 134 is stretched between pulley 126 and a corresponding pulley 135 associated with the drive assembly for capstan 12 (FIG. 3). Pulley 135 is slightly smaller in diameter than pulley 126 so capstan 12 rotates faster than capstan 11. At the same time, the drive assembly for capstan 11 is engaged by pivot arm 83, the drive assembly for capstan 12 is engaged by a pivot arm 136. After the drive assemblies become engaged, capstans 11 and 12 are supported so that are suspended within cartridge 2 as illustrated in FIG. 4 and rotate about a precisely determined axes without appreciable lateral or axial play as motor 132 operates.

Tape 3 is stored in bin area 9 of cartridge 2 in an ordered arrangement of loops which is illustrated in FIG. 5. The loops are aligned approximately parallel to one another. Three distinct regions are formed by the loops of tape in bin area 9. The reverse bends in the loops are concentrated in spaced-apart regions 145 and 146, while the connecting portions of the loops between the bends are concentrated in a region 147 located between regions 145 and 146. The boundary between regions 145 and 147 is designated by an imaginary line 143 and the boundary between regions 146 and 147 is designated by an imaginary line 144. As illustrated in FIG. 5, the bends are distributed randomly within regions 145 and 146. In other words, the loops vary in length in a random fashion between certain upper and lower limits that place the bends in regions 145 and 146. This arrangement of tap loops results in a very efficient utilization of the space in bin area 9. Further, this arrangement of tape loops also permits tape to be pulled out of exit 20 in bin area 9 smoothly without snags or severe changes in tape tension. Specifically, the bends in the tape concentrated in regions 145 and 146 converge as the loops move toward exit 20 due to the tendency of the bends to straighten out. Thus, the tape forms an eye 148 near exit 20 from which tape is pulled by capstans 11 and 12 during transport. Eye 148 forms a more centralized point of tape removal from bin area 9 than fully extended straight loops. As a result, a more constant resistance to the pull of capstans 11 and 12 is provided by the portion of the tape in bin area 9. In other words, a controlled, smooth removal of tape from bin area 9 takes place.

Figure 6A:
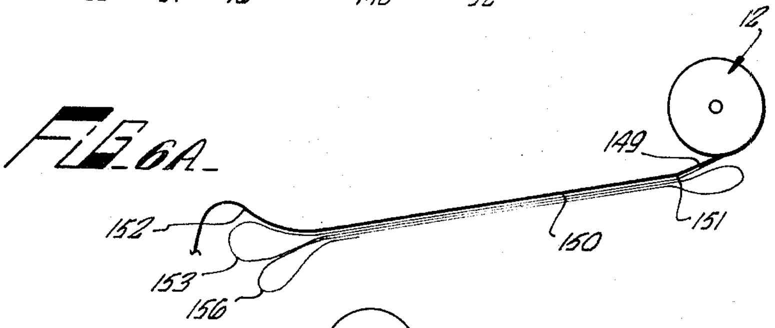
FIGS. 6A through 6D are representations of the formation of the tape loops in the cartridge.
Figures 6B, 6C:
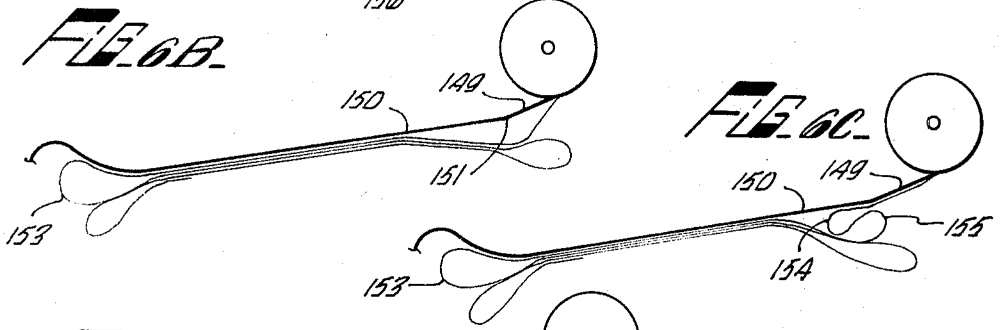
Figure 6D:
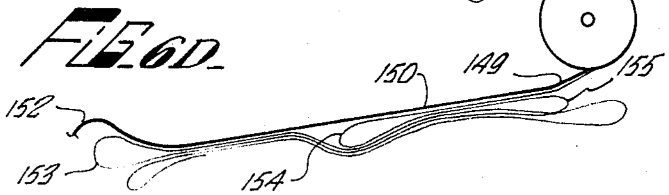

Reference is now made to FIGS. 6A through 6D for consideration of the formation of the loops in bin area 9. FIG. 6A illustrates a portion of partition 19 within cartridge 2 that defines bin area 9. The surface of this portion of partition 19 is specifically designed to form the arrangement of loops having the characteristics described in the preceding paragraph. A straight surface 149 extends from a point immediately adjacent to capstan 12 for a short distance into bin area 9 in the direction of tape travel. A straight surface 150 is located adjacent to surface 149 at an angle to surface 149. Thus, a slight break 151 is formed between surfaces 149 and 150. A gradually curving surface 152 adjoins surface 150. As tape 3 moves past capstan 12 the tape transport speed is sufficiently high so the tape advances across surface 149 and 150 around break 151, as illustrated in FIG. 6B. surface 149 across break 151 and continues along surface 150 until it reaches surface 152. Although the tape is actually in contact with a surface when it is described as advancing across the surface in the following discussion, the tape is represented in FIGS. 6A through 6D spaced slightly from the surfaces to distinguish the tape from the contacting surfaces. As a bend 153 in the tape starts to advance across surface 152, it meets resistance from the adjacent bend 156 which previously occupied surface 152. The tape moves out of contact with surfaces 149 and 150 around break 151, as illustrated in FIG. 6B. Thereafter, the tape reestablishes contact with surface 149 and advances along surface 149 to form the start of a new loop having reverse bends 154 and 155 as illustrated in FIG. 6C. Bend 154 will be located in region 145 after it is fully formed and bend 155 will be located in region 146 after it is fully formed. As illustrated in FIG. 6D, bend 154 pushes the connecting portion of the loop associated with bend 153 toward the other loops in bin area 9 while it advances toward surface 152. When bend 154 passes a short distance over surface 152, a new loop is formed as previously described and the procedure is repeated.

The acute angle between surface 149 and an extension of surface 150 is sufficiently large so that the tape breaks away from surfaces 149 and 150 at break 151. This acute angle is also sufficiently small so that the tape does not break away from surfaces 149 and 150 before the bends in the tape advancing along surface 150 reach surface 152. A typical value for the acute angle between the extension of surface 150 and surface 149 is 11.5 degrees.

As a result of the gradual curve of surface 152, the point to which the tape advances on surface 152 before the tape breaks away from surfaces 149 and 150 to form a new loop varies from loop to loop in a random fashion. As a result, the lengths of the loops formed also vary in a random fashion between limits determined by the shape of the surface 152. Typically, surface 152 could be a circular arc with a 1½-inch radius, surface 149 could be 1.055 inches long and surface 150 could be 7.60 inches long.

The term "tape" as employed in this specification includes all kinds of ribbon-like, transportable, flexible material such as photographic film, paper tape, webbing, etc.

What is claimed is:

1. Tape handling equipment comprising:
a cartridge for storing tape;
a capstan loosely suspended within the cartridge and supported with a freedom to be positioned for aligned rotation about a predetermined axis;
a chassis adapted to receive the cartridge; and
drive means mounted in the chassis and engageable with the capstan for positioning and rotatably driving it about its axis.

2. The tape handling equipment comprising:
a cartridge for storing tape;
a capstan supported within the cartridge with lateral play and freedom for rotation;
a chassis adapted to receive the cartridge;
drive means mounted on the chassis to rotate about an axis, said drive means being engageable with the capstan to rotate the capstan about the axis; and
means on the chassis responsive to engagement of the drive means with the capstan for aligning the capstan with the axis.

3. The tape handling equipment of claim 1, in which the drive means is movable along the axis into and out of engagement with the capstan.

4. The tape handling equipment of claim 1, in which: the capstan is supported by the cartridge with play; and means are provided upon engagement of the drive means with the capstan for precisely positioning the capstan with respect to the drive means so the capstan is suspended within the cartridge.

5. The tape handling equipment of claim 1, in which an endless length of tape is stored in the cartridge and a portion of the length of tape passes over the surface of the capstan.

6. Tape handling equipment comprising:
a cartridge for storing tape;
a capstan within the cartridge supported so it is free to rotate, said capstan having circular holes centered at both ends;
a chassis adapted to receive the cartridge;
drive means mounted on the chassis to rotate about an axis, the drive means being engageable with the capstan to rotate the capstan about the axis; and
circular hubs mounted on the chassis and adapted to fit into the holes in the capstan upon engagement with the drive means with the capstan, whereby the capstan is coupled to the drive means.

7. The tape handling equipment of claim 1, in which:
the capstan has a cylindrical hole extending through its center; and
circular hubs fit into the ends of the hole upon engagement of the drive means with the capstan to couple the capstan to the drive means.

8. The tape handling equipment of claim 1, in which the capstan is supported to rotate without a shaft and rotary bearing.

9. The tape handling equipment of claim 1, in which:
a first flat plate is located adjacent a first end of the capstan, the plate being mounted to the chassis so as to be free to rotate without appreciable axial or lateral play; and
the drive means comprises a second flat plate located adjacent a second end of the capstan and a shaft attached at one end to the second plate, the shaft being mounted to the chassis so as to be rotatable and axially movable without appreciable lateral play to push the second plate into contact with the second end of the capstan and the first end of the capstan into contact with the first plate.

10. The tape handling equipment of claim 9 in which:
the capstan has a hole with a circular cross-section at each end;
the first plate has a protrusion with a circular cross-section that fits snugly in the opening in the first end of the capstan; and
the second plate has a protrusion with a circular cross-section that fits snugly in the opening in the second end of the capstan and has a chamfered end, the protrusions from the first and second plates being aligned with the axis so as to align the capstan with the axis upon engagement of the drive means with the capstan.

11. The tape handling equipment of claim 1, in which:
the capstan comprises a cylindrical core and a cylindrical sheath surrounding the core, the sheath being smaller in height than the core and being set in from both ends of the core; and
the cartridge has substantially parallel top and bottom panels each with aligned circular holes having a larger diameter than the core and a smaller diameter than the sheath, the panels being spaced so the distance between their inside surfaces is larger than the height of the sheath and the distance between their outside surfaces is smaller than the height of the core whereby the capstan is located within the holes in loose fitting relationship.

12. The tape handling equipment of claim 1, in which:
the drive means is axially movable into and out of engagement with the capstan; and
a slot in the chassis receives the cartridge, the cartridge moving into and out of the slot in a direction substantially perpendicular to the axis.

13. A cartridge for tape handling equipment comprising:
an endless length of tape;
top, bottom and side panels enclosing the length of tape, the top and bottom panels being substantially parallel to one another and perpendicular to the width of the tape, the side panels being substantially parallel to the width of the tape;
a circular hole in the top panel and a circular hole in the bottom panel axially aligned with each other;
a capstan extending between the holes in the cartridge, the capstan having a cylindrical core with a smaller diameter than the holes and a greater height than the distance between the exterior surfaces of the top and bottom panels and a cylindrical sheath surrounding the core with a larger diameter than the holes and a smaller height than the distance between the interior surfaces of the top and bottom panels so the sheath remains inside of the cartridge and the ends of the core extend external of the cartridge; and
means for guiding the tape over the capstan.

14. The cartridge of claim 13, in which:
a second circular hole is provided in the top panel and a second circular hole is provided in the bottom panel axially aligned with each other; a second capstan is provided that extends between the second holes in the cartridge, the capstan having a cylindrical core with a smaller diameter than the holes and a greater height than the distance between the exterior surfaces of the top and bottom panels and a cylindrical sheath surrounding the core with a larger diameter than the holes and a smaller height than the distance between the interior surfaces of the top and bottom panels so the sheath remains inside the cartridge and the ends of the core extend external of the cartridge;
the top, bottom, and side panels form a substantially rectangular enclosure having two adjacent rounded corners where the capstans are positioned; and
windows are located in the side panel at the rounded corners to expose the tape passing over the capstans to the exterior of the cartridge.

15. The cartridge of claim 14, in which a transducer window is provided in the side panel substantially midway between the rounded corners.

16. The cartridge of claim 15, in which a guide roller window is provided in the side panel between one of the rounded corners and the transducer window and a guide roller window is provided in the side panel between the other rounded corner and the transducer window.

17. The cartridge of claim 16, in which sufficiently long sections are provided in the side panel between the guide roller windows and the transducer window to contain the portion of the tape between the rounded corners within the cartridge.

18. Tape handling equipment comprising: a cartridge for storing tape; a capstan rotatably mounted within the cartridge with lateral play about its axis of rotation; a chassis having a space adapted to receive the cartridge as it moves into the chassis in a direction substantially perpendicular to the axis of the capstan; a length of tape stored in the cartridge, the tape passing over the surface of the capstan; and rotatable drive means mounted on the chassis in approximate axial alignment with the capstan axis, the drive means being axially retractable out of the space and movable through the space into engagement with the capstan.

19. In tape handling equipment, an arrangement for tensioning tape between a first point and a second point comprising:
a cartridge for storing tape;
a rotatable cylindrical tape handling element located within the cartridge at the first point;
a chassis adapted to receive the cartridge, the cartridge being loaded into the chassis by translational movement;
a length of tape stored within the cartridge, the length of tape passing over the surface of the tape handling element so the direction of tape travel has a component opposite the movement of the cartridge;
means for holding the tape at the second point stationary relative to the cartridge while the cartridge is being loaded in the chassis; and
means located on the chassis for pressing the tape in substantially non-slipping contact with the tape handling element as the cartridge is being loaded into the chassis to rotate the tape handling element and tension the tape between the first and second points.

20. The arrangement of claim 19, in which:
the tape handling element is a capstan;
a window in the cartridge exposes the pressing means to the tape passing over the capstan; and
the pressing means is a pinch roller mounted on a spring loaded arm urged against the tape passing over the capstan, the pinch roller being fixed against rotation opposite the direction of tape travel.

21. The arrangement of claim 20, in which:
the holding means comprises a second capstan rotatably mounted in the cartridge so the tape passes over its surface and a second pinch roller mounted on a spring loaded arm urged toward the second capstan;
a window in the cartridge exposes the tape passing over the capstan to the second pinch roller; and
the second pinch roller presses againts the tape passing over the capstan.

22. An arrangement for tensioning tape stored in a cartridge while the cartridge is being loaded into a shape transport chassis, the arrangement comprising:
first and second rotatable capstans located within the cartridge at the corners of its leading side such that the tape passes over the surface of the capstans at the corners;
a first window in the cartridge located to expose the tape passing over the first capstan at the one corner to the exterior of the cartridge;
a second window in the cartridge located to expose the tape passing over the second capstan at the other corner to the exterior of the cartridge;
a first pinch roller mounted on the chassis so as to bear against the tape passing over the first capstan exposed by the first window as the cartridge is loaded into the chassis, the first pinch roller being rotatable in both directions; and
a second pinch roller mounted on the chassis so as to bear against the tape passing over the second capstan exposed by the second window, the second pinch roller being rotatable in the direction of tape transport and being fixed against rotation in the opposite direction.

23. Tape handling equipment comprising: a cartridge for storing tape having a bin area with an entrance and an exit and a transport area; a capstan located at the entrance of the bin area; an endless length of tape stored in the cartridge, the tape forming a plurality of long loops in the bin area and extending from the exit of the bin area over the capstan to the entrance of the bin area; a first substantially straight surface extending from a point adjacent the capstan in the direction of tape travel toward the interior of the bin area, the tape advancing along the first surface after it passes over the capstan; a second substantially straight surface lying adjacent to and forming an angle with the first surface, the tape advancing along the second surface after it leaves the first surface; and means for breaking the tape at the junction of the first and second surfaces after it advances a minimum predetermined distance from the first surface to initiate a loop at the junction of the first and second surfaces.

24. The tape handling equipment of claim 23, in which the breaking means breaks the tape from the junction of the first and second surfaces after the tape travels beyond the minimum predetermined distance an amount that varies from loop to loop.

25. The tape handling equipment of claim 23, in which the breaking means is a gradually curving surface that adjoins the second surface and curves away from the interior of the bin area.

26. Tape handling equipment comprising:

a cartridge for storing tape having a bin area with an entrance and an exit and a transport area;

a capstan located at the entrance of the bin area;

an endless length of tape stored in the cartridge, the tape forming a plurality of long loops in the bin area and extending from the exit of the bin area over the capstan to the entrance of the bin area;

a surface extending from a point adjacent the capstan in the direction of tape travel toward the interior of the bin area, the tape advancing along the surface after it passes over the capstan;

a gradually curving surface adjoining the first surface to initiate the formation of a loop in the tape near the capstan as the tape advances along the curving surface; and means for forming loops at a designated point along the first surface near the capstan upon initiation by the curving surface.

27. The equipment of claim 26, in which the forming means is an angular bend in the first surface.

28. Tape handling equipment comprising:

a cartridge having a tape transport area and a tape storage area with an entrance point and first storage portion associated therewith, and an exit point and second storage portion associated therewith, the first and second portions thereof being spaced apart and separated by a third storage portion;

an endless tape located within the cartridge;

tape loop forming means extending substantially across the tape storage area from the entrance point to the exit point for forming in the storage area approximately parallel loops in the endless tape, the loops of which are concentrated in the first and second spaced-apart portions of the storage area and the straight parallel connecting portions of the loops are concentrated in the third portion of the storage area; and means for guiding the tape from the exit of the storage area through the transport area to the entrance of the storage area.

29. The tape handling equipment of claim 28 in which the bends are randomly distributed in the first and second regions.

30. Tape handling equipment comprising:

a cartridge having a tape transport area and a tape storage area, said storage area having an entrance and an exit;

an endless tape located within the cartridge, the portion of the endless tape located in the storage area forming approximately parallel loops the bends of which are concentrated in first and second spaced-apart regions of the storage area separated by a third region in which the connecting portions of the loops are concentrated, the tape bends in the first and second regions converging near the exit of the tape storage area to form an eye from which tape is removed from the exit of the tape storage area; and means for guiding the tape from the exit of the storage area through the transport area to the entrance of the storage area.

31. The cartridge of claim 17, in which a partition lies substantially parallel to the side panels in the cartridge to divide the cartridge into a tape transport area and a bin area for tape storage, the partition including:

a first substantially straight surface extending from a point adjacent the second capstan in the direction of tape travel toward the interior of the bin area, the tape advancing along the first surface after it passes over the capstan;

a second substantially straight surface lying adjacent to and forming an angle with the first surface, the tape advancing along the second surface after it leaves the first surface; and a gradually curving surface that adjoins the second surface and curves away from the interior of the bin area.

32. The tape handling equipment of claim 31, in which the portion of the tape located in the bin area forms approximately parallel loops, the bends of which are concentrated in first and second spaced-apart regions of the storage area separated by a third region in which the connecting portions of the loops are concentrated and the tape bends in the first and second regions converge near the exit of the tape storage area to form an eye from which tape is removed from the exit of the tape storage area.

33. The tape handling equipment of claim 18, in which the rotatable drive means comprises:

a drive shaft;

a supporting structure for the drive shaft;

first and second spaced-apart ball bearings supporting the drive shaft with respect to the supporting structure, the ball bearings having inner and outer races;

an inner cylindrical sheath surrounding the shaft and holding the inner races of the bearings in spaced-apart relationship, the inner sheath having a flange near one end and an axial slot near the other end;

an outer cylindrical sheath surrounded by the supporting structure and holding the outer races of the bearings in spaced-apart relationship;

a member fixed to the drive shaft and extending radially from the drive shaft through the slot to a point beyond the inner sheath, the member riding in the slot in the inner sheath; and a compression spring surrounding the drive shaft between the flange and the member to urge the drive shaft in an axial direction.

34. An axially engageable drive assembly for tape handling equipment comprising:

a drive shaft;

a supporting structure;

first and second spaced-apart bearings for supporting the shaft with respect to the supporting structure, the bearings having inner and outer races;

a first cylindrical sheath surrounding the drive shaft and holding the inner races of the bearings in spaced-apart relationship, the inner sheath having a flange near one end and an axial slot near the other end;

an outer cylindrical sheath surrounded by the supporting structure and holding the outer races of the bearings in spaced-apart relationship;

a member fixed to the shaft and extending radially from the shaft through the slot to a point beyond the inner sheath; and a spring surrounding the inner sheath and disposed between the flange and the member to urge the member away from the flange.

References Cited

UNITED STATES PATENTS 3,306,510 2/1967 Brumbaugh --------- 226—118
3,322,906 5/1967 Rothman.

ALLEN N. KNOWLES, Primary Examiner

U.S. Cl. X.R.

226—181, 188, 194

UNITED STATES PATENT OFFICE

CERTIFICATE OF CORRECTION

Patent No. 3,493,158 February 3, 1970

Gordon Richard Schulz

It is certified that error appears in the above identified patent and that said Letters Patent are hereby corrected as shown below:

Column 1, line 38, after "and" insert a comma. Column 4, 1 22, "9 by" should read -- 9 and --. Column 7, line 15, after "1/32" insert -- of an --; line 18, "rotating" should read -- rotation --. Column 8, line 27, "that" should read -- they --; line 47, "tap" should read -- tape --. Column 9, line 3, "and 150 around break 151, as illustrated in FIG. 6B." should read -- . As depicted in FIG. 6A, the tape advances along --. Colum 12, line 33, "shape" should read -- tape --.

Signed and sealed this 1st day of December 1970.

(SEAL)

Attest:

Edward M. Fletcher, Jr.

Attesting Officer

WILLIAM E. SCHUYLER, JR.

Commissioner of Patents